April 9, 1968 — J. SOL — 3,376,779
SELF-LOCKING PIN
Filed Oct. 23, 1965
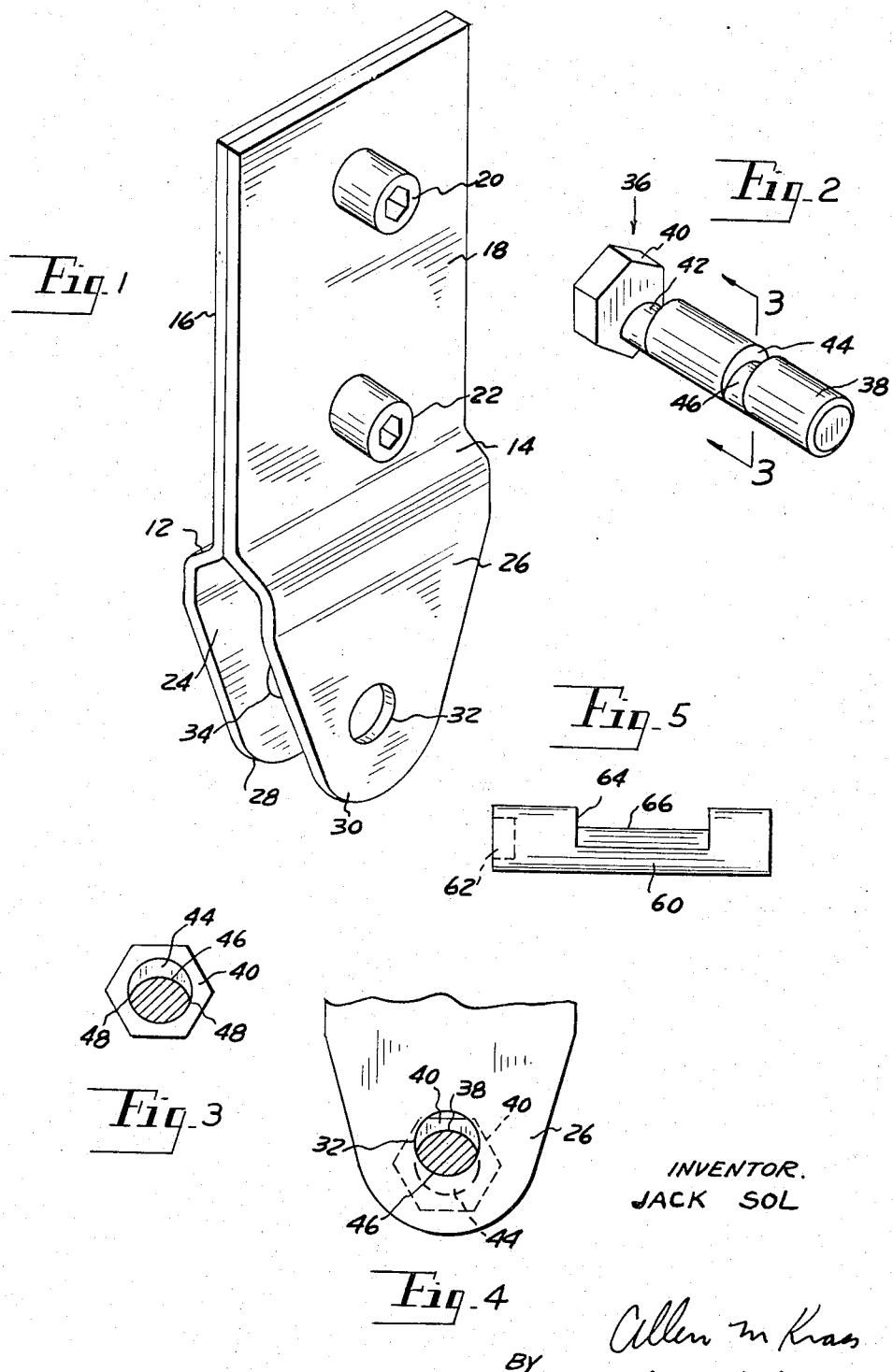
INVENTOR.
JACK SOL
BY Allen M Kras
ATTORNEY United States Patent Office 3,376,779
Patented Apr. 9, 1968

3,376,779
SELF-LOCKING PIN
Jack Sol, 26630 York, Huntington Woods, Mich. 48070
Filed Oct. 23, 1965, Ser. No. 503,810
3 Claims. (Cl. 85—5)

This invention relates to a cylindrical pin adapted to be inserted into a circular aperture formed in a plate and to be locked with respect to the plate against axial movement which would withdraw it from the aperture.

In various mechanisms it is common practice to detachably support a first member with respect to a second member by means of a pin which passes through apertures of both of the members and releasably locks the two together. For example, in overhead conveyors, it is common to support a load by passing a pin through an aperture in a first plate connected to the conveyor then through a hook attached to the load, and then through a coaxial aperture in a second plate also connected to the conveyor. The load may be detached from the conveyor by simply pulling out the pin. It is a broad object of the present invention to provide a pin construction which allows the pin to be locked against axial movement which might cause the pin to withdraw in a simple and inexpensive manner.

This object is broadly achieved by providing one or more slots in the side of the cylindrical pin which are designed to mate with the edges of a plate having an aperture therein when the pin is rotated in a proper manner. This engagement locks the pin against axial movement and allows the pin to be easily unlocked by a simple rotational motion so that the side of the plate no longer engages the slot, but rather rests against an unslotted section of the pin.

Since the pin must often bear a considerable load it is essential that the contact between the pin and the sides of the aperture be distributed over a fair area. In order to accomplish this, the pin is designed to have a diameter only slightly smaller than the aperture and the slot is formed with a convex bottom surface which is generally circular and has a radius approximately equal to that of the pin. In this manner, when the pin is rotated so that the bottom of the slot engages a section of the aperture, the two will mate over a considerable area to distribute the load of the pin over the area and prevent galling.

The slots are so formed in the pins as to leave a sufficient pin cross-sectional area in the vicinity of the slots as to allow the pin to carry the full work load. As a practical guide, it has been found that a minimum of 50% of the cross sectional area must remain in the pin after the slot is formed.

As disclosed in the following detailed description of a preferred embodiment of the invention, one type of pin has a hexhead formed on one end in the manner of a bolt so that a wrench may be employed to rotate the pin into and out of locked position. This pin is adapted to be engaged with a conveyor hanger member having a pair of separated plates. The two plates have coaxial holes formed in them and the pin diameter is approximately ⅛ of an inch smaller than the diameter of the holes. The pin has a pair of identical slots formed on its surface at spacing equal to the spacing between the plates of the hanger member. These slots have convex bottom surfaces formed of the same radii as the pin itself. One slot is formed immediately adjacent to the head of the pin and the other slot is formed a spaced distance away equal to the spacing betwen the plates. The widths of the slots are slightly greater than the thickness of the plates so that the plates may engage the slots when the pin is rotated to a locked position.

It is therefore seen to be a further object of the present invention to provide a cylindrical pin having a tool engaging formation at one end and at least one slot having a thickness which is greater than a plate through which the pin passes, with the slot having a convex lower surface formed of the same radius as the pin.

Another object is to provide such a pin adapted to engage a hanger member having a pair of spaced plates wherein two slots are formed in the pin at the same spacing as the plates and the diameter of the pin and of the convex surface of the slots chosen to be slightly less than the diameter of the apertures in the plate.

Other objects, advantages and applications of the present invention will be made apparent by the following detailed description of two preferred embodiments of the invention. The description makes reference to the accompanying drawings in which:

FIGURE 1 is a perspective view of a hanger member useful with a first embodiment of my invention;

FIGURE 2 is a perspective view of a first embodiment of the invention representing a pin which is adapted to be passed through one of the hanger members of FIGURE 1;

FIGURE 3 is a sectional view through a slot in the pin of FIGURE 2, taken along line 3—3 of FIGURE 2;

FIGURE 4 is a sectional view through a slot in the pin of FIGURE 2, while that pin is in locked position on the hanger of FIGURE 1; and FIGURE 5 is a side view representing a second embodiment of my invention.

Referring to the drawings, the embodiment shown in FIGURES 2, 3, and 4 is used in connection with a conveyor hanger member generally indicated at 10. The hanger member is formed of a pair of plates 12 and 14 which have a pair of abutting surfaces 16 and 18 respectively which are joined by nuts and bolts 20 and 22. The hanger is joined to an overhead conveyor by suitable means (not shown). The plates 12 and 14 are bent away from each other and then rebent into parallel positions to form two parallel separated sections 24 and 26. The lower ends of the sections 24 and 26 are tapered as at 28 and 30 for functional reasons which are not concerned with the present invention.

The sections 24 and 26 contain a pair of identical coaxial circular apertures 32 and 34. The apertures are of the same diameter and are formed through the thickness of the plates 24 and 26.

A pin generally indicated at 36 is intended to be passed through the two apertures so as to support an appropriate load (not shown). The pin consists of an elongated cylindrical section 38 having a diameter approximately ⅛ of an inch smaller than that of the apertures 32 and 34. A hex head 40 is formed on an end of the pin so that it may be rotated by a wrench. The pin has a pair of slots 42 and 44 formed along its length. The slot 42 is formed with the interior wall of the hex head 40 as one of its sides and the slot 44 is spaced from the slot 42 by the same distance as the plates 28 and 30 are spaced from one another. The slots 42 and 44 have a width approximately ¼ of an inch greater than the thickness of the plates 24 and 26. The two slots are identical in configuration and each has a circular, convex lower surface 46 which has the same radius as the pin section 38. The convex surfaces 46 meet the normal perimeter of the pin 38 along lines 48.

The pin 36 is connected to the hanger by passing the cylindrical section 38 through the apertures 32 and 34. A suitable load member (not shown) preferably having an aperture therein is then hung over the pin between the opposed sides of the plates 28 and 30.

The pin is then rotated so that the slots 42 and 44 fall over the lower sections of the plates 28 and 30 surrounding the apertures 32 and 34. The weight of the load prevents the pin from rotating over the non-circular perimeters 48. While the slots engage the edges of the apertures, the pin is locked against axial motion. When the pin is to be released, it may be rotated by a wrench or similar tool through the head 40 until the non-slotted sections of the pin 38 bear against the bottom of the apertures 32 and 34. When the pin is in its locked position an area line of contact is maintained between the bottoms of the slots and the contacting sections of the plate bordering the apertures 32 and 34 because of the similar curvatures of the two sections. This prevents galling of the slots.

FIGURE 5 discloses a second embodiment of the invention comprising a generally cylindrical body member 60 having a recess 62 at one end to receive an Allen wrench. The Allen wrench may be inserted in the recess in order to rotate the pin. This construction allows the pin to be removed from a locking aperture with an axial motion in either direction. The pin has a single wide slot 64 formed in its surface having a convex bottom 66 with approximately the same diameter as the pin 60. This embodiment of the invention is useful in locking situations where the pin is retained against axial movement by the suspended load rather than the hanger plates. The pin passes through an aperture in the load supporting members, the edge of which locks with the single slot.

It should be recognized that other embodiments of the invention are possible having any number of slots and a variety of head configurations.

Having thus described my invention, I claim:

1. A pin for joining a hanger member including a pair of separated plates having circular apertures therein to a third member having an aperture therein comprising: an elongated cylindrical section having a diameter slightly smaller than the apertures adapted to pass through the apertures in the plates and the third member; and a pair of slots on the cylindrical section each having a width slightly greater than the thickness of the two plates, the slots being spaced apart by the same distance as the two plates, the slots each having a convex circular lower surface with a radius substantially equal to that of the cylindrical section, the edges of the slots intersecting the cylindrical sections so that a cross-section through the slots is bounded by two intersecting arcs of substantially equal radii, whereby at least one axial line along the surface of the cylindrical section is uninterrupted.

2. The pin of claim 1 wherein the slot diminishes the original cross sectional area of the cylindrical section by less than 50%.

3. A pin of the type described comprising: an elongated cylindrical section; a head member having wrench flats fixed to one end of the section; and a pair of slots formed in the cylindrical section, one of said slots being located adjacent to the head and the other of said slots being located intermediate said one slot and the opposite end of said section, said slots having a width slightly larger than the thickness of a plate through which the pin must pass, said slots having convex circular lower surfaces having radii approximately equal to that of the cylindrical section, with the edges of said slots merging with the walls of the cylindrical section so that the cross-section of the cylindrical section through the slots consists of a pair of intersecting arcs of substantially equal radii and at least one axial line along the surface of the pin is substantially uninterrupted.

References Cited

UNITED STATES PATENTS

| 2,846,149 | 8/1958  | Newcomer | 85—5    |
|-----------|---------|----------|---------|
| 2,956,442 | 10/1960 | Krekeler | 85—8.1  |
| 3,250,171 | 5/1966  | Taylor   | 85—8.1  |
| 1,808,236 | 6/1931  | Lerner   | 74—254  |
| 3,066,549 | 12/1962 | Benjamin | 74—254  |

CARL W. TOMLIN, *Primary Examiner.*

R. S. BRITT, *Assistant Examiner.*